(12) United States Patent
Seifert et al.

(10) Patent No.: US 8,068,327 B2
(45) Date of Patent: Nov. 29, 2011

(54) HOLDING DEVICE FOR ENCASED HIGH-PROTECTIVE CAPACITORS

(75) Inventors: Josef Seifert, Grosselfingen (DE); Rudi Hueskes, Salzhemmendorf (DE); Matthias Rohde, Pattensen (DE); Alex Itten, Romanshorn (CH)

(73) Assignee: Lenze Drives GmbH, Extertal (DE)

( * ) Notice: Subject to any disclaimer, the term of this patent is extended or adjusted under 35 U.S.C. 154(b) by 644 days.

(21) Appl. No.: 11/996,838

(22) PCT Filed: Jul. 25, 2006

(86) PCT No.: PCT/EP2006/064636
§ 371 (c)(1),
(2), (4) Date: Jul. 21, 2008

(87) PCT Pub. No.: WO2007/012644
PCT Pub. Date: Feb. 1, 2007

(65) Prior Publication Data
US 2009/0002942 A1    Jan. 1, 2009

(30) Foreign Application Priority Data

Jul. 25, 2005  (DE) .......................... 10 2005 034 659

(51) Int. Cl.
*H01G 4/00* (2006.01)
(52) U.S. Cl. ............... 361/301.3; 361/301.4; 361/306.2; 361/529; 361/512; 361/502
(58) Field of Classification Search ............... 361/301.3, 361/301.4, 308.2, 529, 535–537, 502–504, 361/509–512, 311–313, 321.2
See application file for complete search history.

(56) References Cited

U.S. PATENT DOCUMENTS

| 5,550,706 | A | * | 8/1996 | Kurzweil et al. | ............. 361/502 |
| 6,265,661 | B1 |  | 7/2001 | Schweikert et al. | |
| 6,400,538 | B1 |  | 6/2002 | Kistersky et al. | |
| 6,556,424 | B2 | * | 4/2003 | O'Brien | ........................ 361/502 |
| 7,440,258 | B2 | * | 10/2008 | Thrap et al. | ................... 361/502 |
| 7,808,771 | B2 | * | 10/2010 | Nguyen et al. | ................ 361/502 |

FOREIGN PATENT DOCUMENTS

| DE | 200 20 121 U1 | 3/2001 |
| EP | 1 132 930 A1 | 9/2001 |
| EP | 1 424 708 A1 | 6/2004 |
| JP | 05 198457 A | 8/1993 |
| JP | 05198457 A | 8/1993 |
| JP | 05283267 A | 10/1993 |
| JP | 06236825 A | 8/1994 |
| JP | 2000164465 A | 6/2000 |

\* cited by examiner

*Primary Examiner* — Nguyen T Ha
(74) *Attorney, Agent, or Firm* — Stevens & Showalter LLP

(57) ABSTRACT

A holding device for encased capacitors used for electric drive engineering. The inventive holding device comprises integrateable and separable lower and top holding parts. Axially protruded retaining clamps are arranged on the top holding part around each encased capacitor. The lower holding part comprises an opening for the respective capacitor and each opening is surrounded with a sealing lip. The retaining clamps are pressed against the capacitors by the internal surface of the lower holding part. Sections protruded from the respective openings of the lower holding part are embodied in the form of the capacitor sections freely extending directly to a cold air flow of a device. The sealing lip is sealingly placed on the external wall of each encased capacitor in such a way that the penetration of solid or liquid materials inside the lower holding part is prohibited, thereby preventing a high IP protection degree.

44 Claims, 3 Drawing Sheets

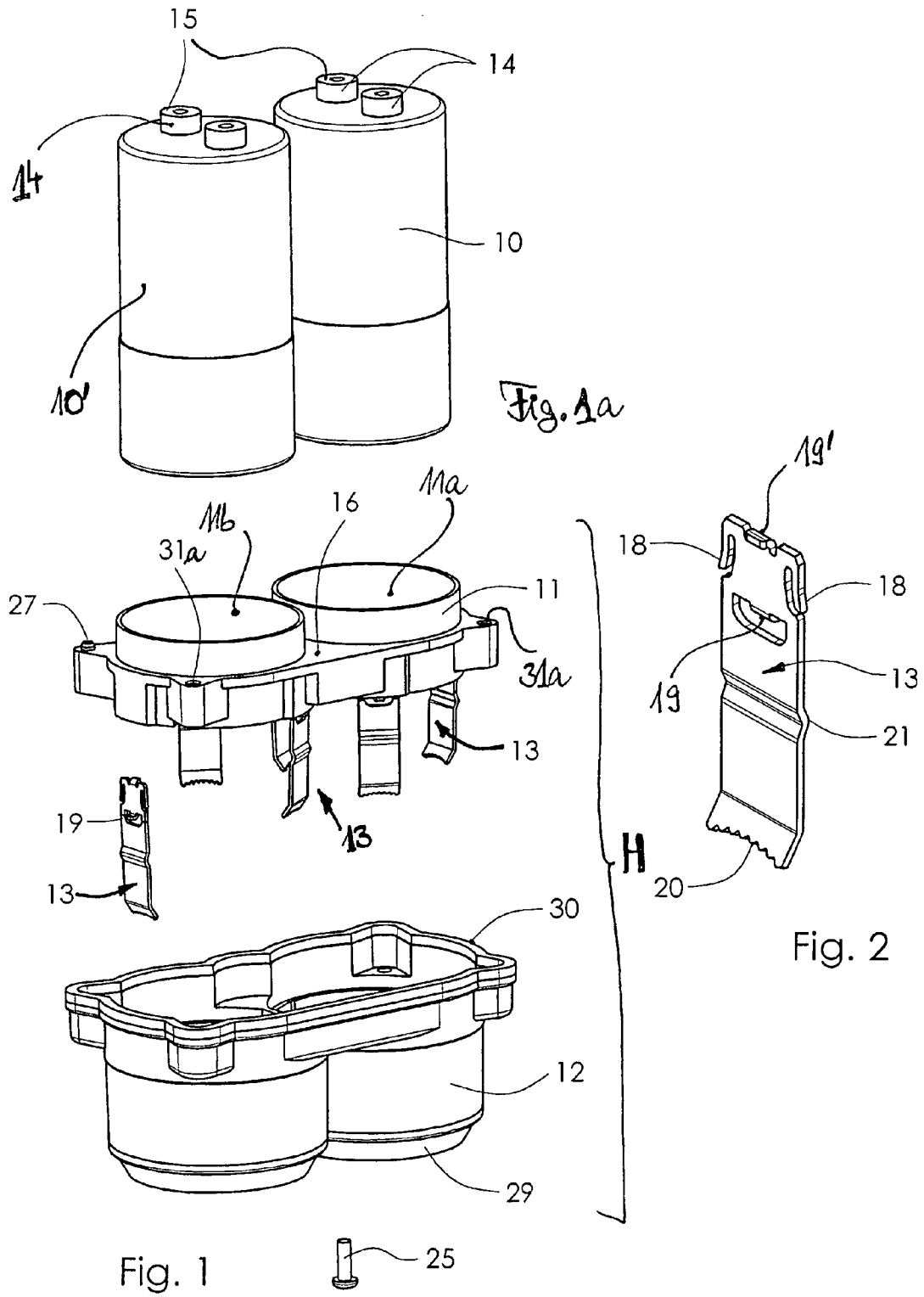

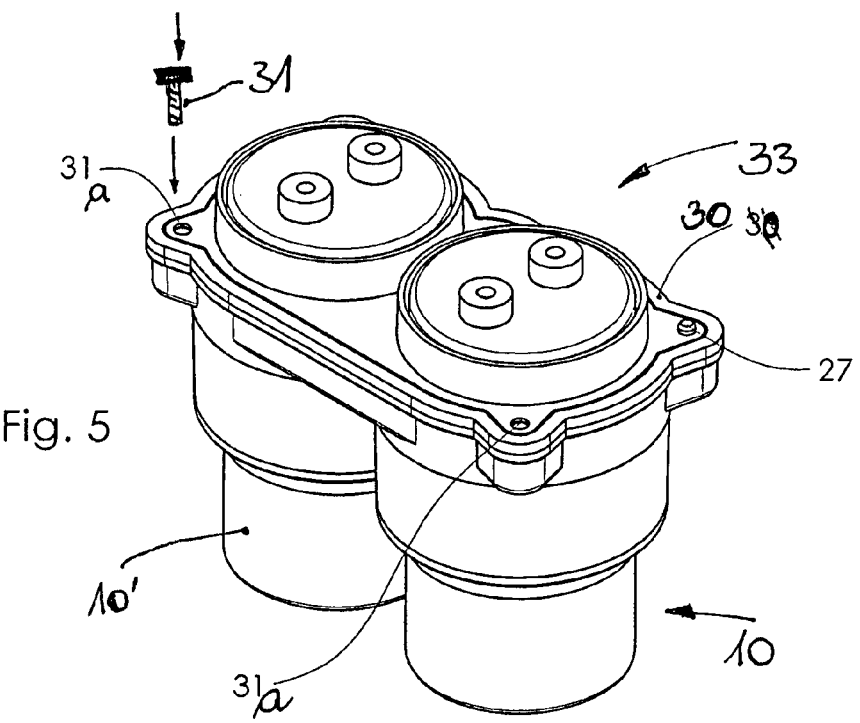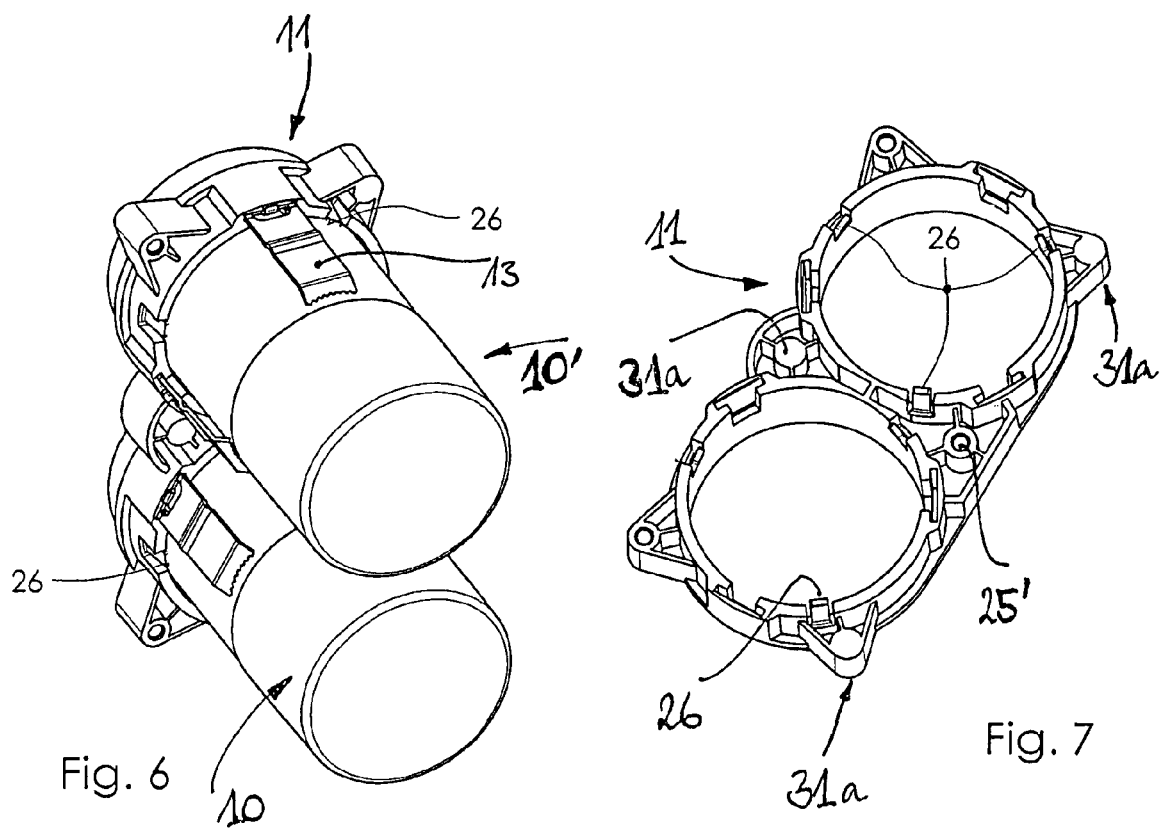

HOLDING DEVICE FOR ENCASED HIGH-PROTECTIVE CAPACITORS

BACKGROUND OF THE INVENTION

1. Field of the Invention

The invention relates to a holding device for electrolytic capacitors to enable a mechanically and electrically improved and more reliable assembly in a device. The capacitors are described; however the protection of claim 1 extends to the holder as such, even without capacitors. Provision is made for air-cooled frequency converters and servos as devices. They are used in electrical drive engineering.

To lengthen the durability of electrolytic capacitors and to be able to use the electrolytic capacitors as highly as possible, it is necessary to keep the core temperature of the electrolytic capacitors as low as possible. For high-protective air-cooled devices (IP54 and above), it lends itself to mount these electrolytic capacitors in the air flow of the cooling body. For this purpose, the following functions must be fulfilled at the same time.

Tightness between air cooling circuit (IP54 and above) and electronic compartment (IP20).

Mechanical fastening of the electrolytic capacitors so that the electric connections of the electrolytic capacitors are not damaged, even in response to vibrations.

Accommodation and equalization of very high can tolerances of electrolytic capacitors.

Optimization of the heat transfer between the interior of the electrolytic capacitors and the passed can surface.

Prepositioning of the electrolytic capacitor connections on the printed circuit board or on the busbar. At the same time, an inverse-polarity protection is to be possible.

Maintaining a predetermined screw direction (from the top) during assembly of the electrolytic capacitor component into the frequency converter or servo.

2. State of the Art

Various solutions already exist for the fastening and the protection of capacitors in this application. EP-A 1 132 930 (Vacon Qy) describes one of these solutions. This solution, however, only serves for the protection and the fastening of the capacitors, without fulfilling demands on a direct cooling of the capacitor housing can in the air flow and a mechanical support of each of the capacitors in the proximity of the center of gravity, because the capacitors are only encased with a closed jacket without additional support. They are installed and wedged into an intermediate housing, see column 5, lines 20 to 30 and column 6, paragraph [027] therein.

Heat dissipation must occur thereby via an additional air and insulation material section. The air gap between encased capacitor and protective cover must potentially still be filled with a very expensive heat conducting paste, so as to be able to dissipate the temperatures created in the capacitor at all. In addition, an outer diameter as well as a length even of "equally large" encased capacitors is subject to very high tolerances, thus making it possible for the air gap for the heat transfer to become very large.

Under the influence of vibrations, as they can arise in response to various applications, a mechanical stabilization of the capacitor is impossible. Due to the large mass and the one-sided attachment of this capacitor type via the connector sockets on the electronic board, the contact surfaces and the support material are highly stressed, which can lead to contact problems or to the breaking of conductor tracks. Furthermore, this solution of the state of the art requires an independent protective can for each capacitor length.

BRIEF SUMMARY OF THE INVENTION

This is to be improved (technical object). The problem is to allow at least one assembled capacitor in the holding device to form an assembly, which is prepositioned and soundly assembled in itself and which is already adapted to the significant periphery of the device, into which the assembly is to be installed. A mechanical fastening of the capacitor(s) must also be achieved so that electrical connections and contact connections of the capacitors are not damaged even in response to vibrations. The accommodation (compensation) of very high can tolerances of electrolytic capacitors are to be permitted. Finally, the heat transfer between the interior of a capacitor in the can and the can surface, which is passed by the coolant air from the outside, is to be optimized.

The improvement is achieved by means of the holding device (without the capacitors) according to claim 1 or by means of its components as holding parts (claims 30 and 31), wherein a mechanical preadjustment of at least one, preferably a plurality of capacitors, is carried out in the holding device (claim 26) and outside of the target device, in which provision is made for the installation of the preassembled assembly. At least two capacitors in one holding device are assembled so as to be axially parallel to one another (claim 28).

The method uses an assembly device, which becomes evident by means of the steps of the method and which comprises corresponding support surfaces or supports only, without separately explaining the assembly device in detail. This assembly device itself is not claimed, but only a method with which the combination consisting of holding components (top holding part and lower holding part) and at least one, preferably two or more capacitors, can be preassembled.

More than two capacitors can also be used, with the holding components being assembled correspondingly and comprising accommodation openings for the plurality of capacitors. All of the plurality of the capacitors are then collectively placed in the holding device, that is, in correct positional arrangement, in correct polarity (protected against polarity reversal) and so as to be accurately adjusted to the specifications in axial and radial direction, said axial and radial directions being initially indicated relative to the holding device (from the two holding parts), wherein said holder (=holding device) comprises a support surface, which is determined in response to the positioning in the device opposite to an assembly surface, which is provided therein, a mounting plate or a plate in the exemplary embodiment, which itself determines in the device the position of the holder with the at least one—already correctly oriented—capacitor. Based thereon, the distance of the electrical connections (the end face thereof, which transmits electricity) is defined as compared to the respective contact surface on the board in the device and is achieved by the holding device in advance (claim 27).

The two holding parts (claim 30, 31), which together form the assembled holding device, which determines the at least one capacitor in a correct axial and radial positional arrangement, allows for a section of each encased capacitor to project freely, said longitudinal section being capable of being flown through by the air flow in response to the assembly in the device, so as to be able to better cool the electrolytic capacitors (claim 1). It is the closed end of the respective encased capacitor, which is located opposite to the connection end (axial).

The retaining clamps are arranged centrically around the capacitor can with a small circumferential distance in such a manner that a simple assembly is achieved. Preferably, the retaining clamps are inserted into the pockets of the top holding part and are anchored in the side surfaces of each of the pockets, preferably by means of resilient brackets. Preferably bent plates form the stop in the depth (claim 6).

Spring plates, which are integrally molded in one piece to the top holding part, are possible as another embodiment of the retaining clamps (claim 7).

When the lower holding part is slid over the capacitors and is pressed forward or downward until it sits on the top holding part, the retaining clamps are pressed radially inward and clamp and fix the capacitor can at the periphery by means of toothings, which are preferably integrally molded on the retaining clamps. When attaching the lower holding part, V-shaped crimps of the retaining clamps preferably come to rest against the respective internal surface of the lower holding part and brace the retaining clamps against the outer jacket of the capacitor can. The reason for this is a resulting redundant clamping surface.

Diameter differences of encased capacitors are compensated by means of the inevitable deflection of the retaining clamps. The toothing of the retaining clamps slightly buries itself into the outer jacket of the capacitor can and thus establishes a form-locking and force-fitting fixation in axial and radial direction, respectively.

The retaining clamps support the capacitor can advantageously and preferably in the region of the center of gravity. This has the advantage that the vibrations acting on the device and the capacitors, respectively, in response to operation and the axial and radial forces, respectively, which result therefrom are accommodated and dampened so as to prevent and avoid destruction of the contact surfaces between electronic board and connector sockets of the capacitors as well as the breaking of support material (laminated paper or fabric-base laminate) and of conductor tracks.

Each holding part, the top (inner) as well as the lower (outer) holding part has an opening for each of the many capacitors, if applicable, the center axes of said openings being axially oriented towards the center axis of the respective capacitor. Provision is made for two respective openings to be located opposite one another and axially flush, respectively.

The claimed holding device (claim 1) differs from known holders, which are cup-shaped, in that a considerable part of the respective capacitor can protrudes freely, without being completely encased, and a respective sealing lip seals from the associated capacitor can above the free-standing section.

The cylindrical accommodation, the accommodation at the top holding part and the accommodation at the lower holding part are thus openings or—in a different/assembled approach—a continuous opening, which comprises a cylindrical frame or at least a cylindrical basic shape, which is adapted to the normal cylindrical shape of the can of the capacitor.

Electrolytic capacitors have a correspondingly high capacity, which preferably lies above 1000 μF (microfarad). They are adapted to the drive engineering and to the corresponding converters and there preferably to the intermediate circuit.

Sliding the lower part (also: slipping the lower holding part) over the capacitor can at its closed can end, which faces away from the connection end results in the fact that this closed end reaches through the lower holding part or, from a different approach, that the lower holding part is pushed over the encased capacitor until it partially overlaps the top holding part and is fixed at an edge region. This fixation can either be carried out by means of clamping pins or by means of screws, which are to be inserted.

In response to the assembly in the device, seals at the top holding part and sealing lips at the lower holding part located opposite the capacitor can define two spaces, one space comprising an IP20 type of protection in the electronic field, which extends to the surrounding seal at the top holding part and which comprises the electric control, and a second space comprising an IP54 type of protection, which provides the cooling air, which is provided at the device by a laterally arranged fan. The exposed axial section of each encased capacitor, which is fixed with the holder, is located in this cooling air flow.

So that the sealing lip is capable of resting tightly against the capacitor can (its outer surface area), provision is made for an elasticity or resilience, wherein, in the unstressed state, it releases a radially narrower opening region, which is enlarged by insertion of the capacitor can and by slipping over the lower holding part, respectively, as to obtain the resulting elastic contact force at the capacitor can for sealing purposes.

Retaining clamps mechanically support the respective encased capacitor from the inside. Pressure in radial direction, in particular in the region of the center of gravity, provides for a reliable fixing. Preferred toothings at the retaining clamps protect against an axial displacement and achieve an accurate localization of the adjusted position of the encased capacitors here as well, also for a long period of time. The radial pressure is achieved by bending the retaining clamps, which are embodied as spring plates or as spring clips, for the purpose of which a geometric shaping can be used, preferably a crimp, which is located at right angles to the longitudinal extension of the respective clip. The radial pressure is applied by the inner side of the lower/outer holding part, when it is slid on axially and when it is slipped over the can or over the cans with its at least one opening.

The assembled capacitors in the holding device form a prepositioned and solidly-assembled structural unit, which is already adapted to the redundant periphery of the device, into which it—the structural unit—is to be installed.

An individual assembly and orientation in the device for each capacitor during its assembly is thus not necessary, see also the present approaches according to U.S. Pat. No. 6,265,661 (position 5 therein), JP-A 06/236 825 (positions 2, 11, 6 therein) or the only partial opening of an can in JP-A 05/198 457 (bushing 6, radial opening 6c therein), which accommodates the capacitor and which is assembled in the center or at the lower end on a sheet metal of the device housing.

BRIEF DESCRIPTION OF THE SEVERAL VIEWS OF THE DRAWINGS

The invention will be explained and supplemented by means of an exemplary embodiment comprising two capacitors 10, 10' with the help of the drawings.

FIG. 1 shows an exploded view of a first capacitor holder H.

FIG. 1*a* shows two capacitor cans 10, 10', which are to be assembled, consistent with openings 11*a*, 11*b* in the top holding part 11.

FIG. 2 shows a retaining clamp 13 in detail.

FIG. 5 shows a general view 33 of the capacitor holder comprising installed capacitors.

FIG. 6 shows a view of the holder when the lower part of the holder is detached for the illustration of centering spring plates 26 in a second guide plane.

FIG. 7 shows a view of the top part of the holder from below for the illustration of the centering spring plates 26 for the axial orientation of the plurality of capacitors or of the one capacitor.

DETAILED DESCRIPTION OF THE INVENTION

Figure 3:
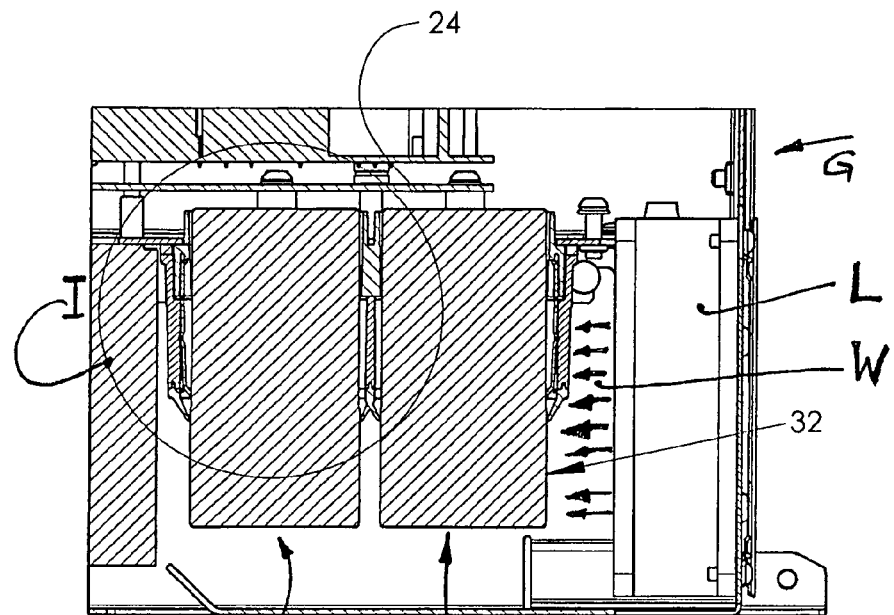
FIG. 3 shows a section through an application comprising an installed capacitor holder and capacitors. I is a partial view.
Figure 4:
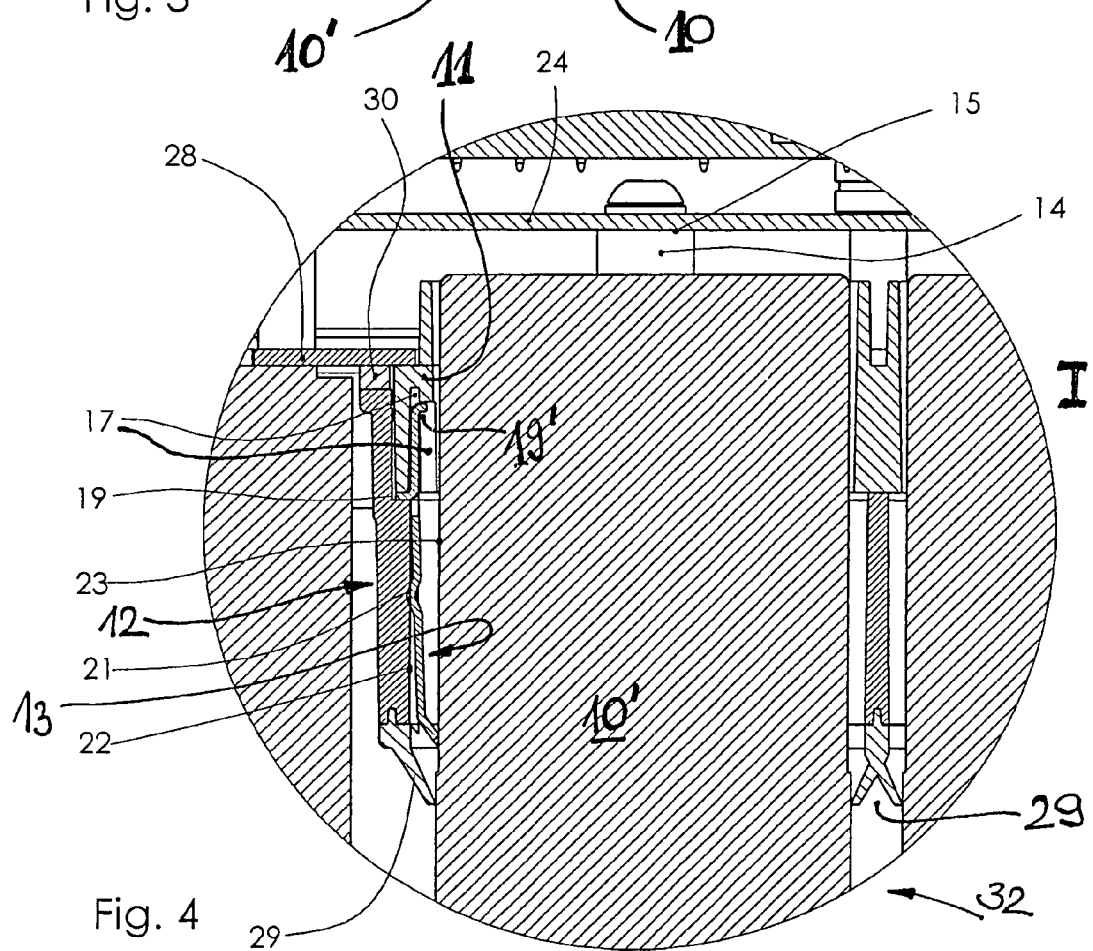
FIG. 4 shows a detailed illustration (enlarged) of the region I of FIG. 3 comprising retaining clamp and sealing situation.

The realizations described herein as example fulfill the requirements listed in the introduction.

The encased capacitors as electrolytic capacitors 10 and 10' together with the holder H (consisting of components or sections 11, 12) form a prefabricated component 33, which can be installed into the housing of a device G, here a frequency converter or servo regulator or any other application with similar requirements.

In a correspondingly equipped assembly device, the capacitors 10 are inserted in a polarity-safe manner by means of mechanical coding or electric checking, with the connector sockets 14 facing downward.

The top holding part 11, which is preassembled with retaining clamps 13 and which is illustrated herein in a double configuration or which is embodied with any accommodation number for can-shaped capacitors, is also pushed over the capacitor can 10 (synonym for "encased capacitor") coded in a correct positional arrangement by means of the assembly device. The position of the holding part 11 is also defined via the assembly device in axial direction of the capacitor cans 10 so that predetermined distances between the end face 15 of the capacitor connector sockets 14 and the contact surface 16 of the top holding part 11 are possible. The dimensions of these distances can be adjusted. It can be chosen arbitrarily. This has the advantage that different installation heights of the position-determining power semiconductor modules can be partly compensated due to the axial displaceability between capacitors and holding elements. The cylindrical openings 11a, 11b accommodate both of the capacitors 10, 10'.

In this assembly step, the retaining clamps 13 are centrically arranged around the capacitor can 10 with a small circumferential distance so that a simple assembly is possible.

The retaining clamps 13 are inserted into pockets 17 of the top holding part 11 and are anchored in the side surfaces of each of the pockets 17 by means of resilient arms 18. Bent plates 19 and 19' form the stop in the depth. One is located at the base; one is located at the front edge of the respective pocket. For this purpose, said bent plates 19, 19' are axially spaced apart.

Spring plates, which are integrally molded on the top holding part 11, can be used as another embodiment of the retaining clamps.

As a next assembly step, the lower part of the holder 12 is slipped over the capacitors 10 and is pressed downward until the lower part of the holder 12 sites on the top part of the holder 11. In this process, the retaining clamps 13 are pressed inwards and clamp and fix the capacitor can 10 at the periphery (its outer surface) by means of toothings 20, which are integrally formed on the retaining clamps 13. When attaching the lower part of the holder 12, V-shaped crimps 21 of the retaining clamps come to rest on an internal surface 22 of the lower part of the holder and brace against the outer jacket 23 of the respective capacitor 10 because of the resulting dimensional overlapping.

Diameter differences of capacitors are balanced via an inevitable bending of the retaining clamps 13. The toothing 20 of the retaining clamps 13 slightly buries itself into the outer jacket 23 of the capacitor can and thus establishes a form-locking and force-fitting fixation in axial and radial directions, respectively.

The retaining clamps 13 advantageously support the respective capacitor can in the region of its center of gravity. This has the advantage that the vibrations acting on the device and on the capacitors, respectively, during operation and the axial and radial forces, respectively, which result therefrom, are accommodated and dampened so as to prevent and avoid destruction of the contact surfaces 15 between an electronic board 24 and the connector sockets 14 of the capacitors as well as the breaking of support material (laminated paper or fabric-base laminate) and of conductor tracks.

Top holding part 11 and lower holding part 12 (and inner and outer part, respectively) are held together in the embodiment illustrated herein by means of screws 25. They engage with bores, as shown in FIG. 7 at 25'. A further embodiment of this joint connection can occur by means of snapping together the plastic parts 11, 12, for example by means of an annular bead or by means of an annular groove.

For the additional centering of the two capacitor cans 10, 10' illustrated herein above a second plane at the periphery, the top holding part 11 (inner part) comprises spring plates 26, which ensure an axially parallel position of the capacitors to the holder. This has the advantage that the connector sockets 14 are located beneath the bores of the electronic board 24 in a highly positionally precise manner during the assembly and that a simple assembly and electric connection is thus possible.

Furthermore, journals 27, which engage with bores of a support plate 28 at the device G and which thus do not permit an incorrect assembly, are integrally molded on the top holding part 11, which has the advantage that an electric polarity reversal is not possible.

For the purpose of obtaining a higher type of protection (e.g. IP54), the lower holding part 12 (outer part) is embodied as a two-component part. The two components (hard/soft connection) are connected with one another during the injection process by selecting corresponding plastic materials per material adhesion. This results in a seal 29, which is accomplished by the softer section.

A further embodiment alternative is possible by means of independent sealing elements, which are to be assembled. It is a circumferentially extending sealing lip per capacitor can.

A sealing lip 29 is integrally molded on the lower housing part 12 on the side of each of the capacitor cans 10, 10', which stand in the air flow. Said sealing lip 29 accomplishes the seal to the outside of the capacitor can. It corresponds to the soft section.

A flat seal 30 is integrally molded on the lower holding part 12 in the contact surface 16. Both seals 30 and 29 prevent the penetration of solid and liquid materials into the interior of the device.

The complete capacitor holder module is screwed to the support plate 28 by means of screws 31, which engage with tapped bores 31a in the installation and assembly wall with the contact surface 16. The flat seal 30 is compressed until the hard screw connection is achieved. The prepositioning of the electrolytic capacitors 10 and 10' is thereby inserted so as to fit into the dimensions of the device.

This embodiment of the lower holder 12 (outer part) comprising sealing elements has the following advantages:

The section 32 of the capacitor 10 or 10' located below the sealing lip 29 is located directly in the cooling air flow W of a fan L, without additional insulation parts, which would hinder the heat transfer, which considerably contributes to the increase of durability and output and which, at the same time, allows for a higher type of protection.

During the device configuration, the electronic board 24 is screwed to and makes contact with the connector sockets 14 of the capacitor 10 from the top. The accurate positioning and height of the capacitor connector sockets is made possible by the afore-described embodiment. The capacitor holder H comprising inner/outer part 11/12 or top/lower part 11/12 can be used for capacitor cans of different lengths.

In the example, a pair of capacitor cans 10, 10' is assembled together in a holder H. For this purpose, the holder has two respectively cylindrical sections, which have correspondingly different shapes for other shapes of capacitor cans. It is possible for only one capacitor can 10 to be assembled in a holder H, as well as for more than two of such encased capacitors, which cooperate, said holder comprising top part/lower part and inner/outer part 11, 12, respectively. The lower part thereby accommodates a section of the top part, especially the section on which the contact surface 16 is located. In the assembled state, an overlapping of outer part 12 and inner part 11 occurs at this wall.

Preferably large storage capacities of above 1000 μF are assembled with the holder; they are electrolytic capacitors, for the most part, which innately have "large capacities".

SUMMARY OF REFERENCE NUMERALS

10 capacitor
10' capacitor
H holder/holding device
11 first holding section (inner holder)
12 second holding section (outer holder)
16 end face for assembly
28 assembly surface in the device (plate, steel plate)
24 board comprising conductor tracks
13 retaining clamps
29 sealing lip
G device of the electric drive engineering
L fan
W air flow of the fan L

We claim:
1. A holding device for at least one encased capacitor comprising a corresponding storage capacity, which is adapted for a use in electric drive engineering, said holding device comprising:
　a lower holding part and a top holding part, which can be integrated and separated, wherein a plurality of retaining clamps axially protruding from the top holding part are arranged centrically around the at least one encased capacitor;
　wherein the lower holding part comprises at least one opening for the at least one encased capacitor, said opening being surrounded by a sealing lip; so that when attaching or slipping the lower holding part on the least one capacitor and the top holding part:
　　the retaining clamps are pressed against the at least one encased capacitor by an internal surface of the lower holding part;
　　wherein a section of each of the at least one encased capacitor protruding from the respective opening of the lower holding part is exposed so as to lie directly in a cooling air flow of a device; and
　　the sealing lip is placed on an external wall of the at least one encased capacitor so as to form a seal for preventing the penetration of solid or liquid materials inside the lower holding part.

2. The holding device according to claim 1, wherein the sealing lip in each case extends continuously around the circumference and is oriented axially downward so as to be resilient when the at least one encased capacitor is inserted or when the lower holding part is slipped over the at least one encased capacitor.

3. The holding device according to claim 1, wherein the upper holding part comprises a flat attachment or an assembly surface.

4. The holding device according to claim 1, wherein the top and the lower holding parts are screwed together in a closed state.

5. The holding device according to claim 1, wherein the holding device is embodied for accommodating at least one encased capacitor, all of which are exposed below the section of the sealing lip assigned thereto or below their respective sealing lip, without additional sealing or insulation parts outside of a respective outer jacket of the encased capacitors in exposed sections.

6. The holding device according to claim 1, wherein the retaining clamps are inserted into pockets of the top holding part and are anchored therein.

7. The holding device according to claim 1, wherein the retaining clamps are spring plates, which are integrally molded on the top holding part in one piece.

8. The holding device according to claim 1 wherein the retaining clamps, at a respective free end, comprise toothings, which slightly bury themselves into a respective outer jacket of the respective encased capacitor, in the installed state of the respective encased capacitor.

9. The holding device according to claim 1, wherein a substantially V-shaped crimp at each retaining clamp cooperates with the internal surface of the lower holding part so as to press and pretension, respectively, the clamps radially inward against a can of the respective encased capacitor.

10. The holding device according to claim 1, wherein different lengths of capacitors, different thicknesses of cylindrical cans and/or different distances between end faces of connector sockets and of a board can be balanced or adapted in the device by means of an axial displacement of the at least one encased capacitor or by means of a radial change of the tension of the retaining clamps in the holding device.

11. The holding device according to claim 1, wherein the retaining clamps hold and fix the at least one encased capacitor in the region of its center of gravity in an axially and/or radially force-fitting manner.

12. The holding device according to claim 1, wherein the retaining clamps are embodied so as to be metallic and the top and the lower holding parts are made from plastic.

13. The holding device according to claim 1, wherein spring plates are arranged on the top holding part so as to be distributed at the periphery and being oriented towards the respective encased capacitor, said spring plates being axially spaced apart from free ends of the retaining clamps so as to hold a respective encased capacitor in a second plane at right angles to the axis of the respective capacitor and so as to orient said capacitor substantially at right angles to a board or to an assembly surface or to an attachment.

14. The holding device according to claim 1, wherein axially oriented journals, which protrude and which are provided for engaging with corresponding recesses at a support surface in the device, are attached to the top holding part at an edge.

15. The holding device according to claim 14, wherein bores with threads are provided at other locations at the edge of the top holding part so that an inaccurate, twisted assembly on the support surface and/or a board is prevented by means of the bores and the journals.

16. The holding device according to claim 15, wherein the bores and the journals, respectively, are each attached at one of two longitudinal sides of the holding device in a region near the edge.

17. The holding device according to claim 16, wherein provision is made for at least one bore on an opposite side of the top holding part for assembly of the lower holding part by means of a screw, in each case at the location where the journals are attached on the side of the top holding part, which points towards the board or to the device.

18. The holding device according to claim 1, wherein the sealing lip is arranged at the lower holding part by means of an adhesive bond, the sealing lip being made of a resilient soft plastic.

19. The holding device according to claim 1, wherein a surrounding seal layer is placed onto an edge, pointing axially, of the top holding part, said seal layer, when assembled, resting against a support surface so as to form a seal.

20. The holding device according to claim 1, wherein each of the capacitors can be screwed to a board in an electrically conductive manner via its connector sockets and contact surfaces of the sockets are thereby pressed against a respective conductor track so as to make contact.

21. The holding device according to claim 1, wherein the lower holding part comprises at least one cylindrical section, which is slipped or pushed over a can of the respective encased capacitor.

22. The holding device according to claim 1, wherein the top holding part comprises at least one cylindrical accommodation, which is connected via a flat section and wherein a top end section of the lower holding part grasps over the flat section.

23. The holding device according to claim 1, wherein the top and the lower holding parts partially overlap one another, a detachable latching or clamping connection being attached in the overlapping region.

24. The holding device according to claim 1, wherein the at least one encased capacitor as an electrolytic capacitor comprises a capacity of at least 1000 μF.

25. The holding device according to claim 1, wherein the retaining clamps are designed as oblong, flat retaining clips.

26. A method for assembling and mechanically stable preadjustement of the position of at least one capacitor in a holder, wherein outside of a device used for electric drive engineering:
the at least one capacitor is inserted or placed in a correctly poled manner or oriented with its connection region facing downward;
a first holding part provided with retaining clamps is pushed over the capacitor can of the capacitor in a correct positional arrangement;
the end of the feed motion of the first holding part is determined by a preadjusted stop;
a second holding part is slipped over the at least one capacitor and is advanced downward until the first and second holding parts join together and until the internal surfaces of the second holding part push or have pushed the retaining clamps radially inwards for abutment to a can of the at least one capacitor; and
the first and second holding parts are connected with one another for a form-locking and force-fitting fixation of the at least one capacitor in axial and radial direction and position, relative to the connected first and second holding parts.

27. The method according to claim 26, wherein conductive surfaces of a connection region of the at least one capacitor and a plane attachment or assembly surface at the first holding part have a preadjusted distance, for integration into the device used for electric drive engineering for the simultaneous mechanical positioning and electrical contacting.

28. A holding device for encased capacitors as a plurality of electrolytic capacitors arranged in parallel comprising corresponding storage capacity, which is adapted for a use in electric drive engineering, said holding device comprising:
a lower holding part and a top holding part, which can be joined together and separated, wherein axially protruding retaining clamps are arranged on the top holding part centrically around a can of each of the capacitors;
wherein the lower holding part comprises a respective opening for each of the capacitors, which, in each case, is surrounded by a sealing lip so that when the lower holding part is placed onto or slipped over the capacitors and the upper holding part:
internal surfaces of the lower holding part press the retaining clamps against the capacitors;
sections of the capacitors protruding from the opening of the lower holding part are exposed so as to reach directly into a cooling air flow of a device; and
the sealing lips rest against external walls of the encased capacitors so as to form a seal for preventing the penetration of solid or liquid materials into an interior of the lower holding part.

29. The holding device according to claim 28, wherein each of the sealing lips extends in a circumferentially continuous manner and is oriented axially downward so as to be resilient in response to the insertion of the corresponding capacitor and when the lower holding part is slipped over the capacitors, respectively.

30. A lower holding part for a holding device of at least one encased capacitor, which is adapted for a use in electric drive engineering, comprising:
a respective opening for each of the encased capacitors, each of which is surrounded by an elastic sealing lip so that when the lower holding part is placed onto or slipped over each of the encased capacitors:
a closed section or sections of the at least one encased capacitor protruding from the respective opening of the lower holding part is/are exposed so as to reach directly into the cooling air flow of a device; and
the respective sealing lip rests against external walls of the at least one encased capacitor so as to form a seal for preventing the penetration of solid or liquid materials into an interior of the lower holding part.

31. A top holding part for a holding device for at least one encased capacitor, which is adapted for a use in electric drive engineering, comprising:
axially protruding retaining clamps are arranged on the top holding part centrically around a respective opening for an encased capacitor;
wherein, when a lower holding part is placed onto or slipped over the encased capacitors and the top holding part;
the retaining clamps can be pressed as retaining clips against the encased capacitors;
the retaining clamps comprise crimps for giving them a radial pressure component, which causes them to attach to the encased capacitors in a clamping manner.

32. The top holding part according to claim 31, wherein the retaining clamps are inserted into pockets of the top holding part and are anchored therein.

33. The top holding part according to claim 31, wherein the retaining clamps are spring plates integrally molded on the top holding part in one piece.

34. The top holding part according to claim 31, wherein the retaining clamps, at respective free ends, comprise toothings, which slightly bury themselves into a respective outer jacket of the respective encased capacitor, in the assembled state of the respective encased capacitor.

35. The top holding part according to claim 31, wherein a substantially V-shaped crimp cooperates with the internal surface of the lower holding part at each retaining clamp so as to press and pretension, respectively, the retaining clamps radially inward against a can of the respective encased capacitor.

36. The holding part according to claim 31, wherein the retaining clamps hold and fix the at least one encased capacitor in the region of its center of gravity in an axially and/or radially force-fitting manner.

37. The top holding part according to claim 31, wherein the retaining clamps are embodied so as to be metallic.

38. The top holding part according to claim 31, wherein spring plates are arranged on the top holding part so as to be distributed at the periphery and being oriented towards the respective encased capacitor, said spring plates being axially spaced apart from free ends of the retaining clamps so as to hold a respective encased capacitor in a second plane, at right angles to the axis of the respective encased capacitor, and so as to orient said encased capacitor substantially at right angles to a board or to an assembly surface or to a contact surface.

39. The top holding part according to claim 31, wherein axially oriented journals, which protrude and which are provided for engaging with corresponding recesses at a support surface in a device, are attached to the top holding part at an edge.

40. The top holding part according to claim 39, wherein bores with threads are provided at other locations at the edge of the top holding part so that an inaccurate, twisted assembly on the support surface and/or a board is prevented with the bores and the journals.

41. The top holding part according to claim 40, wherein the bores and the journals, respectively, are each attached at one of two longitudinal sides of the holding device in a region near the edge.

42. The top holding part according to claim 41, wherein the bores are provided on an opposite side of the top holding part for assembly of the lower holding part by means of a screw, in each case at the location where the journals are attached on the side of the top holding part, which points towards the board.

43. The top holding part according to claim 31, wherein a circumferentially extending seal layer is placed onto an edge, facing axially, of the top holding part, said seal layer, when assembled, resting against a support surface so as to form a seal.

44. The top holding part according to claim 31, wherein each of the capacitors is screwed to a board in an electrically conductive manner via its connector sockets and the contact surfaces are thereby pressed against a conductor track so as to make contact.

* * * * *

UNITED STATES PATENT AND TRADEMARK OFFICE
CERTIFICATE OF CORRECTION

PATENT NO. : 8,068,327 B2
APPLICATION NO. : 11/996838
DATED : November 29, 2011
INVENTOR(S) : Josef Seifert et al.

Page 1 of 1

It is certified that error appears in the above-identified patent and that said Letters Patent is hereby corrected as shown below:

Column 10, line 50, "clamps arc arranged on the top" should read -- clamps arranged on the top --.

Signed and Sealed this
Fifth Day of June, 2012

David J. Kappos
*Director of the United States Patent and Trademark Office*